US009388342B2

(12) United States Patent
Orino et al.

(10) Patent No.: US 9,388,342 B2
(45) Date of Patent: Jul. 12, 2016

(54) ELECTRIC ACTUATOR FOR COKE DRUM UNHEADING VALVE

(71) Applicants: Christopher Orino, Salt Lake City, UT (US); Ruben F. Lah, South Jordan, UT (US)

(72) Inventors: Christopher Orino, Salt Lake City, UT (US); Ruben F. Lah, South Jordan, UT (US)

(73) Assignee: Delta Valve, LLC, Sandy, UT (US)

( * ) Notice: Subject to any disclaimer, the term of this patent is extended or adjusted under 35 U.S.C. 154(b) by 826 days.

(21) Appl. No.: 13/646,480

(22) Filed: Oct. 5, 2012

(65) Prior Publication Data

US 2013/0284583 A1    Oct. 31, 2013

Related U.S. Application Data

(60) Provisional application No. 61/640,594, filed on Apr. 30, 2012.

(51) Int. Cl.
| | |
|---|---|
| *C10B 27/06* | (2006.01) |
| *F16K 31/02* | (2006.01) |
| *F16K 31/50* | (2006.01) |
| *C10B 33/12* | (2006.01) |
| *C10B 43/06* | (2006.01) |
| *C10B 25/10* | (2006.01) |
| *F16K 31/04* | (2006.01) |

(52) U.S. Cl.
CPC ................. *C10B 27/06* (2013.01); *C10B 25/10* (2013.01); *C10B 33/12* (2013.01); *C10B 43/06* (2013.01); *F16K 31/02* (2013.01); *F16K 31/048* (2013.01); *F16K 31/508* (2013.01)

(58) Field of Classification Search
CPC ........ C10B 27/06; C10B 33/12; C10B 43/06; F16K 31/02; F16K 31/048; F16K 31/508
See application file for complete search history.

(56) References Cited

U.S. PATENT DOCUMENTS

| | | | | | |
|---|---|---|---|---|---|
| 3,861,221 | A | * | 1/1975 | Stanley | 74/25 |
| 4,050,319 | A | * | 9/1977 | Stanley | 74/424.92 |
| 4,218,102 | A | * | 8/1980 | Moser | 384/455 |
| 4,964,314 | A | * | 10/1990 | Wilkes | 74/424.92 |
| 8,277,349 | B2 | * | 10/2012 | Erhart et al. | 475/2 |
| 8,851,451 | B2 | * | 10/2014 | Orino et al. | 251/267 |
| 2011/0053723 | A1 | * | 3/2011 | Erhart et al. | 475/1 |
| 2011/0083747 | A1 | * | 4/2011 | Orino et al. | 137/1 |
| 2012/0256111 | A1 | * | 10/2012 | Hoang et al. | 251/264 |

* cited by examiner

*Primary Examiner* — Renee E Robinson
*Assistant Examiner* — Jonathan Miller
(74) *Attorney, Agent, or Firm* — Michael F. Krieger; Kirton McConkie

(57) ABSTRACT

An electric actuator is provided for operating an unheading valve of a coke drum. The electric actuator includes a driving element comprising a planetary roller screw for actuating the unheading valve. By using a planetary roller screw, rather than hydraulics for the driving element, the electric actuator of the present invention can be used in place of hydraulic actuators while still providing sufficient power and reliability for use with an unheading valves of a coke drum.

14 Claims, 5 Drawing Sheets

ELECTRIC ACTUATOR FOR COKE DRUM UNHEADING VALVE

CROSS-REFERENCE TO RELATED APPLICATIONS

This application claims priority to U.S. Provisional Patent Application No. 61/640,594, titled NON-RISING ELECTRIC ACTUATED VALVE OPERATOR, which was filed on Apr. 30, 2012.

BACKGROUND

Petroleum coke, or coke, is a byproduct of the petroleum refining process. Coke may be produced using a delayed coking process in which residual oil is heated to its thermal cracking temperature. The delayed coking process utilizes a coke drum in which the heated residual oil is pumped and maintained at high heat and pressure, and then allowed to cool. The delayed coking process is generally carried out over a 24 hour period.

Once the coke has cooled sufficiently, valves on the top and bottom of the coke drum are opened to allow the coke to be removed from the drum Generally, the coke is removed using a high pressure water cutting tool inserted through the top valve to break the coke into pieces that fall out of the drum through the opened bottom valve.

Coke drums are very large, and when full, can contain thousands of tons of coke. Additionally, because coke drums are pressurized during the delayed coking process, the top and bottom valves are designed to have near zero tolerances between the valve components. Because of the enormous weight from the coke combined with the near zero tolerances, a strong actuator is required to operate the valve.

Many prior art unheading valves have been designed to be operated by hydraulic actuators because of their relative strength and reliability. Hydraulic valve actuators, however, suffer from various drawbacks. For example, hydraulic valve actuators, when compared to electric valve actuators, generally require more maintenance, are more complex to install, are more difficult to position, can be less efficient, require a more complex control system, and pose greater environmental concerns. Unfortunately, prior art attempts to design an electric valve actuator for operating an unheading valve of a coke drum have been unsuccessful.

BRIEF SUMMARY

The present invention extends to an electric actuator for operating an unheading valve of a coke drum. The electric actuator includes a driving element comprising a planetary roller screw for actuating the unheading valve. By using a planetary roller screw, rather than hydraulics for the driving element, the electric actuator of the present invention can be used in place of prior art hydraulic actuators while still providing sufficient power and reliability for use on unheading valves of a coke drum.

In one embodiment, an electric actuator for operating an unheading valve of a coke drum comprises a driving element, a gear reducer coupled to the driving element, a torque limiting coupler coupled to the gear reducer, and a motor coupled to the torque limiting coupler. The driving element comprises a planetary roller screw assembly for converting rotary motion into linear motion to operate the unheading valve.

In another embodiment, a coke drum unheading valve system comprises an unheading valve, a driving element coupled to the unheading valve, a gear reducer coupled to the driving element, a torque limiting coupler coupled to the gear reducer, and a motor coupled to the torque limiting coupler. The driving element comprises a planetary roller screw assembly for converting rotary motion into linear motion to operate the unheading valve.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to an electric actuator for operating an unheading valve of a coke drum. The electric actuator includes a driving element comprising a planetary roller screw for actuating the unheading valve. By using a planetary roller screw, rather than hydraulics for the driving element, the electric actuator of the present invention can be used in place of prior art hydraulic actuators while still providing sufficient power and reliability for use on unheading valves of a coke drum.

In one embodiment, an electric actuator for operating an unheading valve of a coke drum comprises a driving element, a gear reducer coupled to the driving element, a torque limiting coupler coupled to the gear reducer, and a motor coupled to the torque limiting coupler. The driving element comprises a planetary roller screw assembly for converting rotary motion into linear motion to operate the unheading valve.

In another embodiment, a coke drum unheading valve system comprises an unheading valve, a driving element coupled to the unheading valve, a gear reducer coupled to the driving element, a torque limiting coupler coupled to the gear reducer, and a motor coupled to the torque limiting coupler. The driving element comprises a planetary roller screw assembly for converting rotary motion into linear motion to operate the unheading valve.

Figure 1:
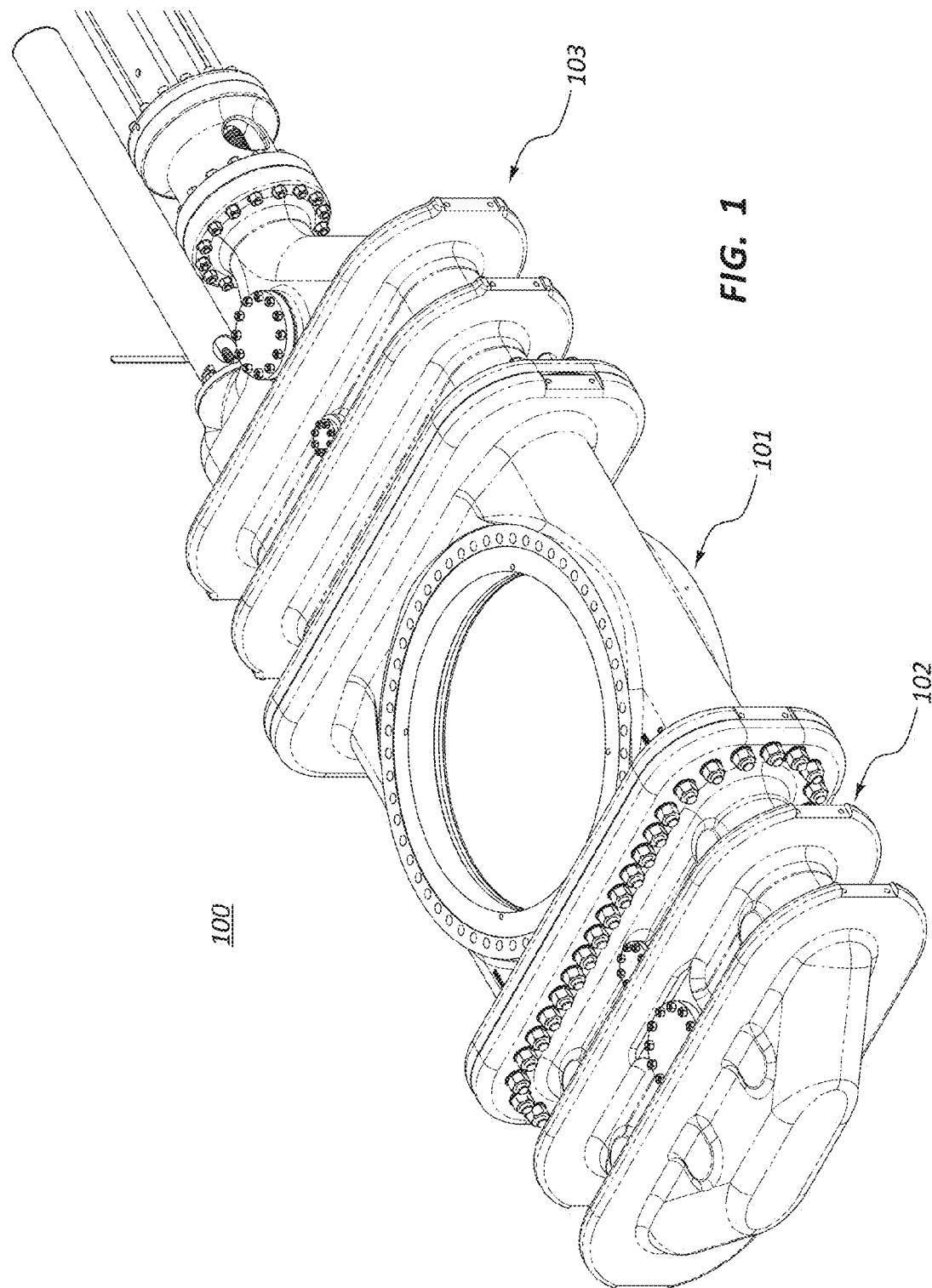
FIG. 1 illustrates an exemplary unheading valve on which the electric actuator of the present invention can be used.

FIG. 1 illustrates an exemplary unheading valve 100 on which the electric actuator of the present invention can be used. Unheading valve 100 includes a body 101, a lower bonnet 102, and an upper bonnet 103. Unheading valve 100 is connected to a coke drum and contains a blind that slides back and forth to open and close the valve.

Figure 2:
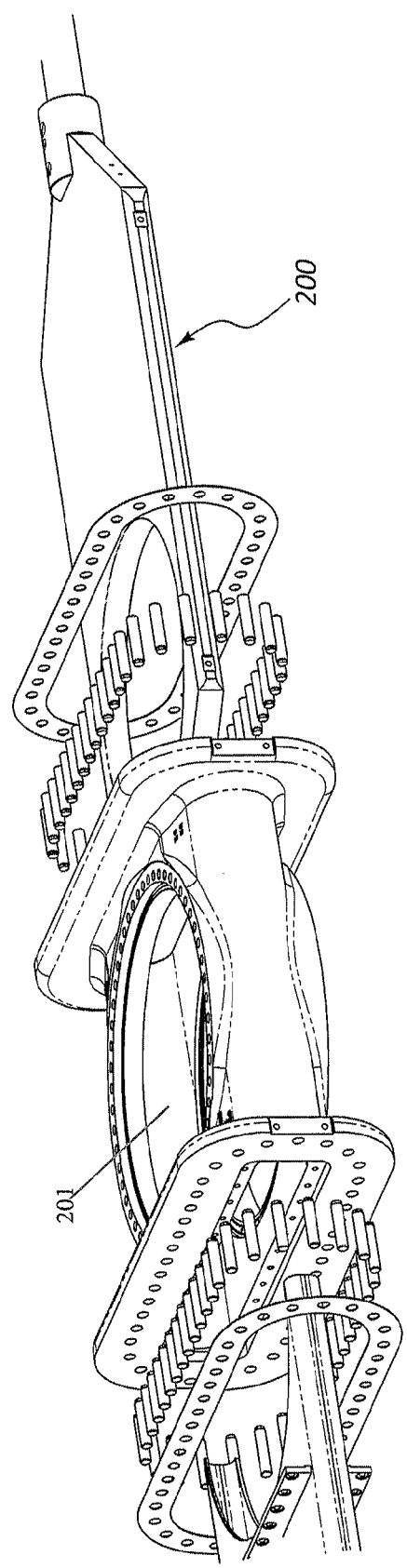
FIG. 2 illustrates an exemplary blind that can be used in the unheading valve of FIG. 1.

FIG. 2 illustrates an exploded view of unheading valve 100. Unheading valve 100 includes a sliding blind 200. As shown, blind 200 is rectangular in shape and contains an opening 201. Unheading valve 100 is opened by sliding blind 200 so that opening 201 is aligned with an opening of the coke drum.

Figure 3:
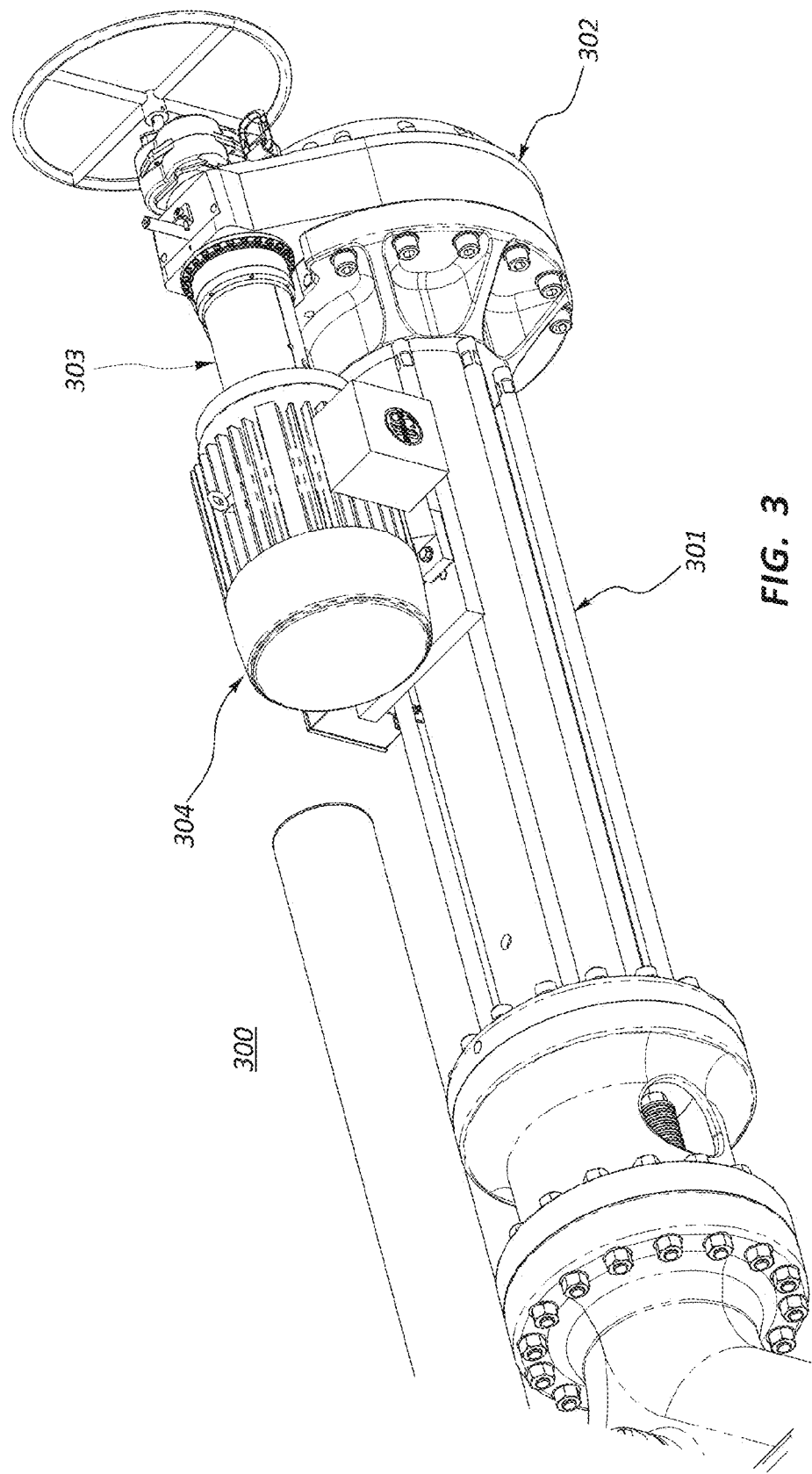
FIG. 3 illustrates an electric actuator according to one or more embodiments of the present invention.

FIG. 3 illustrates an electric actuator 300 according to one or more embodiments of the present invention. Electric actuator 300 can be attached to unheading valve 100 to operate unheading valve 100 by sliding blind 200 between the closed and open position.

Electric actuator 300 comprises a driving element 301, a gear reducer 302, a torque limiting coupler 303, and a motor 304. Rotary motion is provided by motor 304 to driving element 301 through torque limiting coupler 303 and gear reducer 302. Driving element 301 is also connected to blind 200 and is used to slide blind 200 between the closed and open position.

Figure 4:
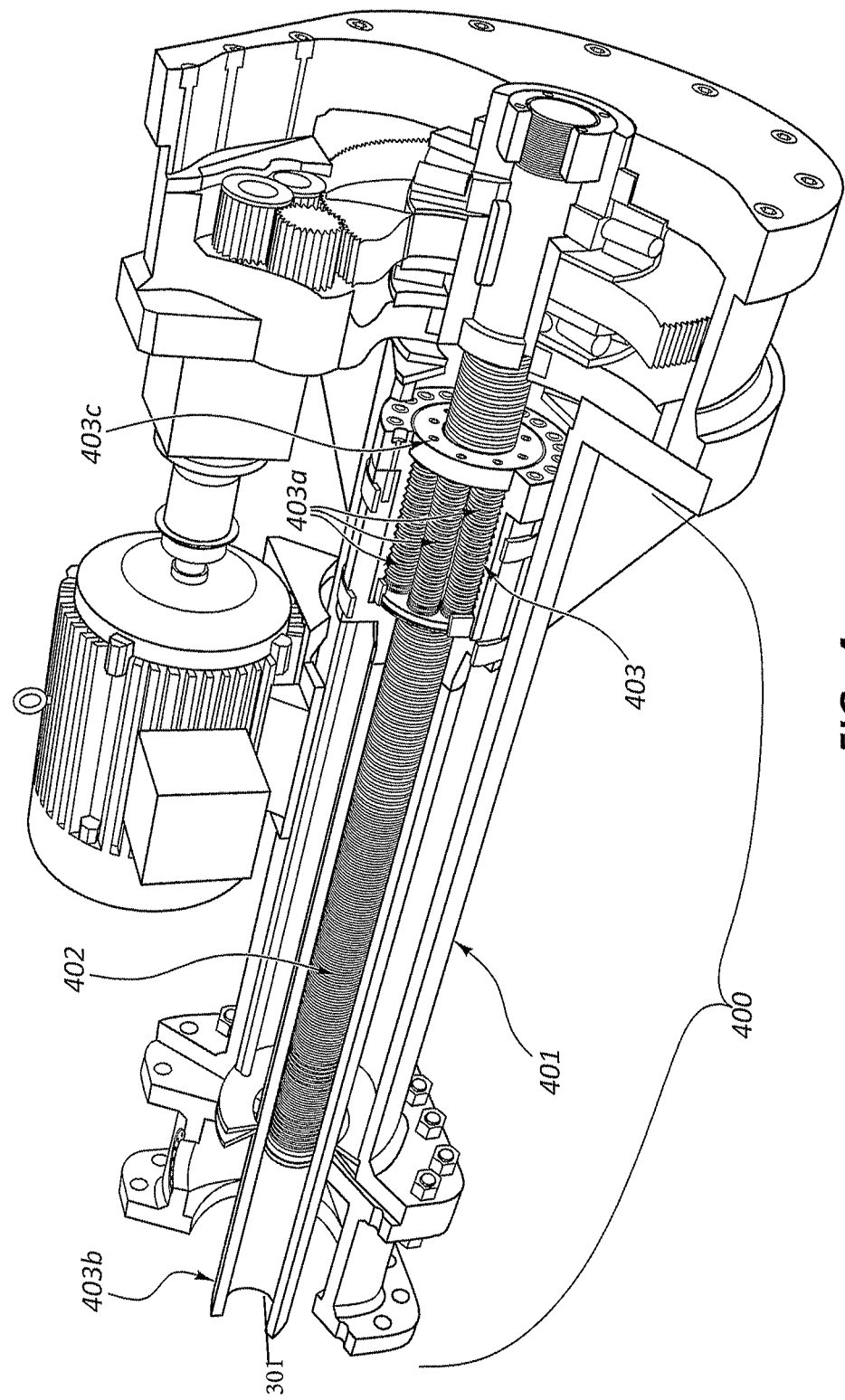
FIGS. 4 and 5 illustrate a driving element of the electric actuator according to one or more embodiments of the present invention.
Figure 5:
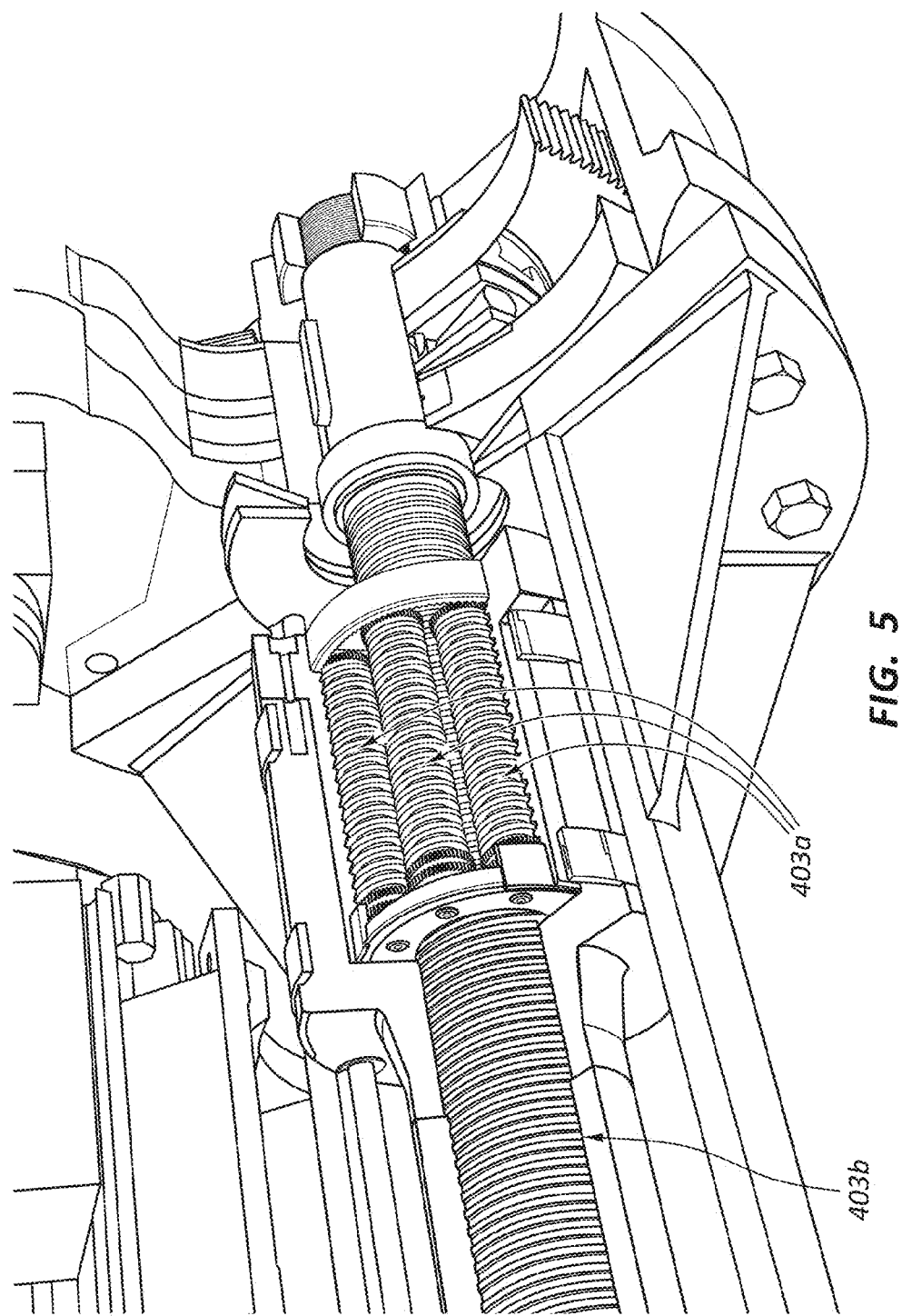

FIG. 4 illustrates a detailed view of driving element 301. As shown, driving element 301 comprises a planetary roller screw assembly 400. Planetary roller screw assembly 400 is a liner actuator that converts the rotary motion from motor 304 into linear motion. Planetary roller screw assembly 400 includes housing 401, a main threaded shaft 402, and a planetary component 403. Planetary component 403 contains an arrangement of threaded rollers 403a that interact with main threaded shaft 402 to convert rotary motion into linear motion.

Specifically, when main threaded shaft 402 is rotated by gear reducer 302, the threads on main threaded shaft 402 and on threaded rollers 403a cause planetary component 403 to move in a linear direction (e.g. left or right depending on the direction of rotation of main threaded shaft 402).

Planetary component 403 is connected to blind 200 so that when planetary component 403 is moved in a linear direction, blind 200 also moves in the linear direction. Accordingly, the position of blind 200 can be adjusted by rotating main threaded shaft 402 in the appropriate direction.

Because of the number of threaded rollers 403a which surround main threaded shaft 402 and which are in continuous contact with main threaded shaft 402, the force from the rotation of main threaded shaft 402 is applied on a greater surface area thus providing a large amount of thrust to effectively operate an unheading valve such as unheading valve 100.

FIG. 4 also shows that planetary component 403 includes a shaft 403b that extends from a housing portion 403c which contains the threaded rollers 403a. Shaft 403b connects to blind 200. As planetary component 403 is moved linearly along main threaded shaft 402, shaft 403b extends out from driving element 301. Upper bonnet 103 of unheading valve 100 can be configured to allow shaft 403b to extend into upper bonnet 103.

One advantage of electric actuator 300 is that, because of the use of planetary roller screw assembly 400, the overall length of electric actuator 300 is reduced. Specifically, main threaded shaft 402 only needs to be of sufficient length to allow planetary component 403 to move the distance between the open and closed positions of unheading valve 100. For example, if the difference in the position of blind 200 when opened and closed is five feet, main threaded shaft 402 only needs to be of sufficient length to allow planetary component 403 to move five linear feet.

Further, because shaft 403b of planetary component 403 extends into upper bonnet 103 and then retracts back into driving element 301, the length of driving element 301 does not need to be increased to accommodate the linear movement of planetary component 403. Due to the limited space that is generally available around a coke drum, this minimal size of electric actuator 300 is very beneficial. Further, the minimal size also facilitates the use of electric actuator 300 as a replacement to hydraulic actuators on existing coke drum installations.

Gear reducer 302 can include axial thrust bearings which allow gear reducer 302 to be much smaller while still being capable of reacting a large thrust load to drive unheading valve 100. Gear reducer 302 can also include a manual override to allow manual operation of electric actuator 300.

Torque limiting coupler 303 serves to separate motor 304 from the driven elements (e.g. driving element 301, gear reducer 302, and blind 200). In the event of a torque overload, torque limiting coupler 303 disengages thus allowing motor 304 to run freely without acting on the other components in electric actuator 300. In this way, torque limiting coupler 303 provides complete mechanical protection to planetary roller screw assembly 400 in the event of a torque overload. In some embodiments, the torque level at which torque limiting coupling 303 disengages is adjustable.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. An electric actuator for operating an unheading valve of a coke drum, the electric actuator comprising;
    a driving element comprising:
        a housing having a proximal end and a distal end, the distal end being configured to couple to a bonnet of an unheading valve of a coke drum, the proximal end being configured to couple to a gear reducer:
        a main threaded shaft positioned within the housing, the main threaded shaft having a proximal end that extends through the proximal end of the housing and is secured to a gear of the gear reducer, the main threaded shah also including a distal end that is positioned at the distal end of the housing:
        a planetary component having a housing portion that encases the main threaded shaft and a shaft portion that extends distally from the housing portion and also encases the main threaded shaft a distal end of the shaft portion being configured to couple to a blind of the unheading valve, the housing portion containing a number of threaded rollers that are positioned around and contact the main threaded shaft such that when the main threaded shaft is rotated, interaction between threads of the main threaded shaft and threads of the threaded rollers cause the planetary component to move linearly within the housing thereby causing the blind to move linearly;
    the gear reducer that includes a distal end that is coupled to the proximal end of the housing of the driving element and that includes the gear that is secured to the proximal end of the main threaded shaft, the distal end of the gear reducer further including an interface for coupling the gear reducer to a torque limiting coupler;

the torque limiting coupler that is coupled to the interface of the gear reducer such that the torque limiting coupler extends alongside the housing of the driving element; and a motor that is mounted to the housing of the driving element, the motor being coupled to the gear of the gear reducer via the torque limiting coupler.

2. The electric actuator of claim 1, wherein the housing portion contains eight threaded rollers.

3. The electric actuator of claim 1, wherein the distal end of the shaft extends distally out of the housing when the main threaded shaft is rotated.

4. The electric actuator of claim 3, wherein the distal end of the shaft inserts into the bonnet of the unheading valve when the main threaded shaft is rotated.

5. The electric actuator of claim 1, wherein the gear reducer includes axial thrust bearings.

6. The electric actuator of claim 1, wherein the gear reducer includes a manual override.

7. The electric actuator of claim 1, wherein the torque limiting coupler is adjustable to adjust the torque level at which the torque limiting coupling disengages.

8. A coke drum unheading valve system comprising:

an unheading valve that is configured to be coupled to the top or the bottom of a coke drum, the unheading valve including a bonnet and a blind that slides within the unheading valve to open or close the unheading valve;

a driving element comprising:

a housing having a proximal end and a distal end, the distal end being configured to couple to the bonnet, the proximal end being configured to couple to a gear reducer;

a main threaded shaft positioned within the housing, the main threaded shaft having a proximal end that extends through the proximal end of the housing and is secured to a gear of the gear reducer, the main threaded shaft also including a distal end that is positioned at the distal end of the housing;

a planetary component having a housing portion that encases the main threaded shaft and a shaft portion that extends distally from the housing portion and also encases the main threaded shaft, a distal end of the shaft portion being configured to couple to the blind the housing portion containing a number of threaded rollers that are positioned around and contact the main threaded shaft such that when the main threaded shaft is rotated, interaction between threads of the main threaded shaft and threads of the threaded rollers cause the planetary component to move linearly within the housing thereby causing the blind to move linearly;

the gear reducer that includes a distal end that is coupled to the proximal end of the housing of the driving element and that includes the that is secured to the proximal end of the main threaded shaft, the distal end of the gear reducer further including an interface for coupling the gear reducer to a torque limiting coupler:

the torque coupler that is coupled to the interface of the gear reducer such that the torque limiting coupler extends alongside the housing of the driving element; and a motor that is mounted to the housing of the driving element, the motor being coupled to the gear of the gear reducer via the torque limiting coupler.

9. The coke drum unheading valve system of claim 8, wherein the housing portion contains eight threaded rollers.

10. The coke drum unheading valve system of claim 8, wherein the distal end of the shaft extends distally out of the housing when the main threaded shaft is rotated.

11. The coke drum unheading valve system of claim 10, wherein the distal end of the shaft inserts into the bonnet of the unheading valve when the main threaded shaft is rotated.

12. The coke drum unheading valve system of claim 8, wherein the gear reducer includes axial thrust bearings.

13. The coke drum unheading valve system of claim 8, wherein the gear reducer includes a manual override.

14. The coke drum unheading valve system of claim 8, wherein the torque limiting coupler is adjustable to adjust the torque level at which the torque limiting coupler disengages.

* * * * *